Aug. 22, 1939.  B. A. DICKERSON  2,170,679
LOCK FOR TELESCOPIC STANDARDS
Filed Nov. 15, 1938
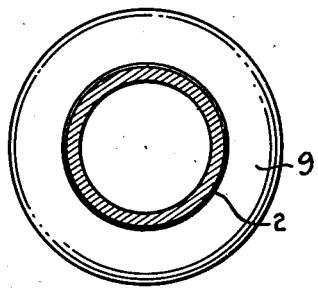
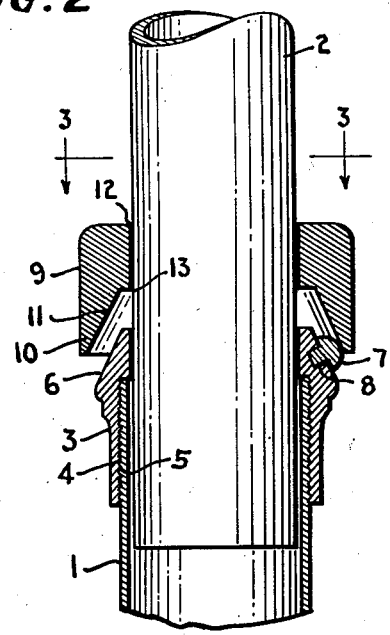
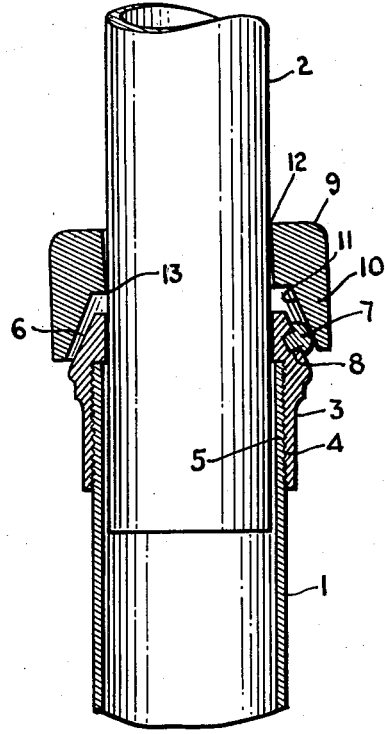
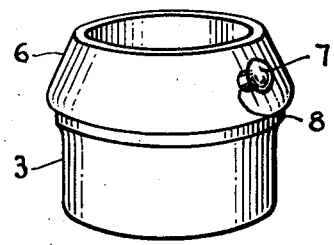
BERT A. DICKERSON
INVENTOR
BY Harry Lea Dodson.
ATTORNEY Patented Aug. 22, 1939

2,170,679

UNITED STATES PATENT OFFICE 2,170,679

LOCK FOR TELESCOPIC STANDARDS

Bert A. Dickerson, Decatur, Ill., assignor to Faries Manufacturing Company, Decatur, Ill., a corporation of Illinois Application November 15, 1938, Serial No. 240,440

3 Claims. (Cl. 287—58)

My invention relates to that class of devices which are designed to provide a quick and easy adjustment of the heighth of the telescopic standard of a portable lamp. Although it will be apparent from the hereinafter contained description that it is not limited to lamps, but can be employed in any case where it is desired to alter the vertical length of a telescopic tubular standard.

My invention has for its principal object to provide a simple and inexpensive construction which will permit free movement in one direction when the inner or telescoping tube is drawn upwardly, but will automatically lock it against retraction when the outward movement ceases. Provision is made for manually releasing the lock when it is desired to lower the lamp.

My means of accomplishing the foregoing object may be more fully comprehended by having reference to the accompanying drawing, which is hereunto annexed and is a part of this specification in which:

Fig. 1 is a vertical section of a fragment of a telescopic lamp standard in its normal position, the telescoping tube being shown in elevation;

Fig. 2 is a similar view with the lock in released position;

Fig. 3 is a cross section, on line 3—3 Fig. 2;

Fig. 4 is an isometric perspective view of the lock.

Similar reference numerals refer to similar parts throughout the entire specification.

As shown in the drawing, the standard comprises an outer vertical tube 1 into which telescopes an inner tube 2 which obviously is of smaller diameter than the tube 1. A lamp or bridge arm (not shown) may be secured to this inner tube 2.

Mounted on an end of the outer tube 1 is a bushing 3 clearly seen in Fig. 4. This bushing 3 is preferably provided with internal threads 4 which fit threads 5 cut on the end of the outer tube 1. The outer end of the bushing 3 is tapered off as at 6, clearly seen in Fig. 4. On the tapered portion 6 I mount a pin 7 which is inserted in a hole 8 drilled or formed in the tapered portion 6 of the bushing 3, the purpose of which will hereinafter appear.

Slidable upon the telescoping inner tube 2 and loosely fitting thereon is a collar 9. This collar has a downwardly depending flange 10. The internal surface 11 of the flange 10 is tapered as clearly seen in Figs. 1 and 2.

The operation of the device is as follows: When one desires to alter the position of the lamp (not shown) he grasps the collar 9 and moves it out of contact with the pin 7, the head of which projects outwardly and beyond the surface of the tapered portion 6 of the bushing 3. The inner tube 2 can then be freely moved in either direction up or down. When the desired position has been reached, he drops the collar 9 which falling by gravity brings the tapered surface 11 of the flange 10 into contact with the head of the pin 7 on the tapered portion 6 of the bushing 3. This causes the collar 9 to tip or cock upon the tube 2 and, as clearly seen in Fig. 1, the upper edge 12 of the central opening of the collar will bite into the tube 2 as will also the bottom edge 13 at the opposite side of the collar. The result is that the tube 2 is held from further movement until the collar 9 is moved to the position shown in Fig. 2.

Indeed it has been found in practice that one may grasp the tube 2 and it can be freely moved upwardly without touching the collar 9. It is only when one desires to lower the tube 2 that the collar must be moved in the manner as above set forth.

It will be clearly seen from the foregoing description that all of the parts can be made on a screw machine, or die cast, thus attaining the most inexpensive construction. Also that no manipulation of the parts is necessary to make the desired adjustment.

Having described my invention what I regard as new and desire to secure by Letters Patent is:

1. In a device of the character described, a pair of telescoping tubes, a bushing mounted on the end of the outer tube, the outer surface of said bushing being tapered, a pin mounted in said tapered portion, its head projecting beyond the surface thereof, a collar loosely slidable upon the inner tube, a downwardly depending flange on said collar, the inner surface of said flange being tapered and adapted to contact the head of said pin on said bushing, whereby the collar will be tipped and lock the inner tube in the desired position.

2. In a device of the character described, a pair of telescoping tubes, a bushing mounted on the end of the outer tube, a collar loosely mounted on the inner tube, said collar having a downwardly depending flange the inner surface of which is tapered, projecting means on the surface of said bushing which upon contact with the tapered surface of said flange on said collar causes said collar to tilt thereby locking the inner tube against further downward movement.

3. In a device of the character described, a pair of telescoping tubes, a projection confined to less than half of the circumference formed near the upper end of the outer of said tubes, a collar having a downwardly divergent internal surface loosely mounted on the inner of said tubes, the radial distance of said projection from the axis of said outer tube being intermediate the maximum and minimum radii of said divergent surface, said projection upon contact with said divergent surface acting to tilt said collar into locking engagement with said inner tube.

BERT A. DICKERSON.